(12) United States Patent
Douglas

(10) Patent No.: US 11,465,731 B2
(45) Date of Patent: Oct. 11, 2022

(54) DUCT STRINGER WITH BULKHEAD

(71) Applicant: AIRBUS OPERATIONS LIMITED, Bristol (GB)

(72) Inventor: Paul Douglas, Bristol (GB)

(73) Assignee: Airbus Operations Limited, Bristol (GB)

( * ) Notice: Subject to any disclaimer, the term of this patent is extended or adjusted under 35 U.S.C. 154(b) by 359 days.

(21) Appl. No.: 16/451,337

(22) Filed: Jun. 25, 2019

(65) Prior Publication Data

US 2020/0001971 A1   Jan. 2, 2020

(30) Foreign Application Priority Data

Jun. 29, 2018  (GB) ...................................... 1810730

(51) Int. Cl.
  *B64C 3/18*   (2006.01)
  *B64F 5/10*   (2017.01)
  (Continued)

(52) U.S. Cl.
  CPC .............. *B64C 3/182* (2013.01); *B29C 70/30* (2013.01); *B29C 70/86* (2013.01); *B64C 3/34* (2013.01);
  (Continued)

(58) Field of Classification Search
  CPC .. B64C 3/182; B64C 3/34; B64C 3/26; B29C 70/30; B29C 70/86; B29C 70/446;
  (Continued)

(56) References Cited

U.S. PATENT DOCUMENTS 3,034,608 A * 5/1962 Dengler .................. B64C 3/182
                                                29/897.3
4,645,244 A * 2/1987 Curtis ................. F16L 27/0857
                                                285/226
(Continued)

FOREIGN PATENT DOCUMENTS

| EP | 2 336 021 | 6/2011 |
| EP | 2 987 720 | 2/2016 |
| WO | 2016/162818 | 10/2016 |

OTHER PUBLICATIONS

European Search Report cited in EP 19182168.5 dated Oct. 28, 2019, 6 pages.
(Continued)

*Primary Examiner* — Medhat Badawi
(74) *Attorney, Agent, or Firm* — Nixon & Vanderhye P.C.

(57) ABSTRACT

A duct stringer has duct walls providing a duct with a closed cross-section; and a bulkhead in the duct. The duct is adapted to transport fluid, and the bulkhead is adapted to block the flow of fluid along the duct. The bulkhead is adhered to the duct walls by one or more co-cured or co-bonded joints. The bulkhead includes a pair of bulkhead parts, each with a web and one or more flanges. The duct stringer is manufactured by positioning the mandrels end-to-end with the bulkhead parts back-to-back between them; wrapping or laying-up the duct walls around the bulkhead parts and the mandrels; co-curing or co-bonding the flanges of the bulkhead parts to the duct walls; and after the bulkhead has been adhered to the duct walls, removing the mandrels from opposite ends of the duct.

14 Claims, 16 Drawing Sheets

US 11,465,731 B2

Page 2

(51) Int. Cl.
*B29C 70/30* (2006.01)
*B29C 70/86* (2006.01)
*B64C 3/34* (2006.01)
B29K 307/04 (2006.01)
B29K 701/12 (2006.01)
B29L 31/30 (2006.01)
F16L 9/06 (2006.01)

(52) U.S. Cl.
CPC ............ *B64F 5/10* (2017.01); *B29K 2307/04* (2013.01); *B29K 2701/12* (2013.01); *B29L 2031/3076* (2013.01); *F16L 9/06* (2013.01)

(58) Field of Classification Search
CPC ............ B29D 99/0003; B29K 2307/04; B29K 2701/12; B29L 2031/3076; B29L 2031/3085; B64F 5/10; F16L 9/06
See application file for complete search history.

(56) References Cited

U.S. PATENT DOCUMENTS

| | | | | |
|---|---|---|---|---|
| 4,802,642 A * | 2/1989 | Mangiarotty | ........... | B64C 23/00 244/130 |
| 5,263,747 A * | 11/1993 | Lefebvre | ................. | F16L 33/26 285/903 |
| 5,348,601 A * | 9/1994 | Ray | ........................ | B29C 53/22 264/258 |
| 5,370,427 A * | 12/1994 | Hoelle | .................... | F16L 27/11 285/226 |
| 5,527,414 A * | 6/1996 | Dublinski | ........... | B29D 24/007 428/116 |
| 5,538,589 A * | 7/1996 | Jensen | ............... | B29D 99/0003 156/583.8 |
| 5,624,622 A * | 4/1997 | Boyce | .................. | B29C 44/569 264/258 |
| 5,632,940 A * | 5/1997 | Whatley | .................. | B62M 3/00 156/193 |
| 6,170,157 B1 * | 1/2001 | Munk | ...................... | B64F 5/10 29/407.01 |
| 6,315,332 B1 * | 11/2001 | Aschoff | ............. | F01N 13/1816 285/227 |
| 6,458,309 B1 * | 10/2002 | Allen | ................. | B29D 99/0014 156/197 |
| 6,510,961 B1 * | 1/2003 | Head | .................... | B29C 53/587 244/119 |
| 6,632,502 B1 | 10/2003 | Allen et al. | | |
| 7,040,666 B2 * | 5/2006 | Christianson | ........... | F02K 1/805 285/264 |
| D551,336 S * | 9/2007 | Haggkvist | .................... | D23/386 |
| 7,625,618 B1 * | 12/2009 | Allen | ................. | B32B 5/28 428/36.91 |
| 7,641,147 B2 * | 1/2010 | Schmidt | .................... | B64F 5/10 244/123.1 |
| 7,708,224 B2 * | 5/2010 | Aho-Mantila | ......... | B64D 27/18 244/54 |
| 7,740,202 B2 * | 6/2010 | Namaizawa | ............... | B64C 3/18 244/131 |
| 8,167,245 B1 * | 5/2012 | Koehler | .................... | B64C 3/34 244/135 R |
| 8,714,485 B2 * | 5/2014 | Matheson | ................. | B32B 7/08 244/123.1 |
| 8,776,351 B2 * | 7/2014 | Bird | ...................... | F16L 21/065 285/369 |
| 9,010,689 B1 * | 4/2015 | Brook | .................... | B64D 37/10 244/135 R |
| 9,399,509 B2 * | 7/2016 | Rolfes | .................... | B64C 3/182 |
| 10,384,401 B2 * | 8/2019 | Frasca | .................... | B29C 66/131 |
| 2002/0178992 A1 * | 12/2002 | Lewit | ................. | B29C 44/0461 264/258 |
| 2003/0192990 A1 * | 10/2003 | Simpson | ............... | B29C 70/546 244/123.7 |
| 2004/0035981 A1 * | 2/2004 | Nunn, Jr. | .................. | B64C 3/26 244/123.8 |
| 2005/0003145 A1 * | 1/2005 | Toi | ........................ | B29C 70/443 428/102 |
| 2005/0263645 A1 * | 12/2005 | Johnson | .................... | B63B 3/36 244/119 |
| 2006/0145010 A1 * | 7/2006 | Schmidt | .................... | B64C 3/185 244/123.8 |
| 2006/0226287 A1 * | 10/2006 | Grantham | ................. | B64C 5/06 244/119 |
| 2006/0249626 A1 * | 11/2006 | Simpson | .................... | B64C 3/20 244/123.1 |
| 2008/0111024 A1 * | 5/2008 | Lee | ........................ | B64C 1/12 244/119 |
| 2008/0128552 A1 * | 6/2008 | Namaizawa | .............. | B64C 3/18 244/123.1 |
| 2008/0128554 A1 * | 6/2008 | Pham | .................... | B64C 3/182 244/131 |
| 2008/0223987 A1 * | 9/2008 | Halme | .................... | B64C 3/187 403/287 |
| 2008/0265094 A1 * | 10/2008 | Van Der Veen | ........ | B64C 3/185 244/123.1 |
| 2008/0290214 A1 * | 11/2008 | Guzman | ................. | B64C 3/182 244/119 |
| 2008/0302912 A1 * | 12/2008 | Yip | ........................ | B29C 70/446 244/119 |
| 2008/0302915 A1 * | 12/2008 | Yip | ........................ | B29C 70/342 244/132 |
| 2009/0072088 A1 * | 3/2009 | Ashton | .................... | B64C 3/187 264/258 |
| 2009/0072429 A1 * | 3/2009 | Ashton | ................. | B29C 66/929 264/241 |
| 2009/0121082 A1 * | 5/2009 | Godenzi | .................... | B64C 3/18 244/123.1 |
| 2009/0127393 A1 * | 5/2009 | Guzman | ............ | B29D 99/0003 244/133 |
| 2009/0206203 A1 * | 8/2009 | Crawford | ................ | B64C 3/187 29/457 |
| 2009/0266936 A1 * | 10/2009 | Fernandez | .............. | B64C 1/064 244/119 |
| 2009/0314892 A1 * | 12/2009 | Kunichi | .................... | B64C 3/187 244/123.1 |
| 2010/0025529 A1 * | 2/2010 | Perry | ...................... | B64C 1/065 52/843 |
| 2010/0139850 A1 * | 6/2010 | Morris | .................... | B29C 33/485 156/500 |
| 2010/0139857 A1 * | 6/2010 | Pham | .................... | B29C 70/446 425/389 |
| 2010/0304094 A1 * | 12/2010 | Brook | .................... | B64C 3/182 156/253 |
| 2011/0011975 A1 * | 1/2011 | Boursier | ................. | B32B 5/022 428/688 |
| 2011/0027526 A1 * | 2/2011 | McCarville | .......... | B29D 99/001 428/116 |
| 2011/0073155 A1 * | 3/2011 | Sillmann | ................. | H02S 20/23 403/364 |
| 2011/0073763 A1 * | 3/2011 | Subbarao | .................. | G01T 1/1611 250/363.04 |
| 2012/0069432 A1 * | 3/2012 | Liang | ...................... | G02B 23/02 359/401 |
| 2012/0241560 A1 * | 9/2012 | Erickson | ................. | B64C 1/26 285/285.1 |
| 2013/0049258 A1 * | 2/2013 | Rotter | .................... | B29C 70/461 264/255 |
| 2013/0115429 A1 * | 5/2013 | Valle | ........................ | B29C 70/30 156/304.1 |
| 2013/0118624 A1 * | 5/2013 | Burnickas | ............... | F16K 11/02 137/1 |
| 2013/0133171 A1 * | 5/2013 | Miguez Charines | ........ | B29D 99/0003 29/428 |
| 2013/0302172 A1 * | 11/2013 | Williams | .................... | F01D 5/147 156/60 |
| 2013/0316147 A1 * | 11/2013 | Douglas | .................... | B64C 3/26 156/60 |
| 2013/0327477 A1 * | 12/2013 | Hollensteiner | ....... | B29C 33/505 156/382 |

(56) References Cited

U.S. PATENT DOCUMENTS

| | | | |
|---|---|---|---|
| 2014/0209745 A1* | 7/2014 | Hosokawa | B64C 3/187 244/123.1 |
| 2014/0248140 A1* | 9/2014 | Jacques | F01D 5/3038 415/183 |
| 2014/0262614 A1* | 9/2014 | Rushin | B65D 11/10 206/524.1 |
| 2014/0272312 A1* | 9/2014 | Sammons | B64C 1/061 156/257 |
| 2014/0284426 A1* | 9/2014 | Erickson | B64C 1/06 244/135 R |
| 2014/0299713 A1* | 10/2014 | Komoda | B64C 3/34 244/123.1 |
| 2015/0239570 A1 | 8/2015 | Brook et al. | |
| 2015/0252824 A1* | 9/2015 | Benthien | F16B 11/006 156/60 |
| 2015/0336656 A1* | 11/2015 | Rolfes | B64C 3/34 244/123.1 |
| 2016/0052617 A1* | 2/2016 | Rolfes | B64D 37/10 244/119 |
| 2020/0001971 A1* | 1/2020 | Douglas | B29C 70/30 |

OTHER PUBLICATIONS

Combined Search and Examination Report for GB1810730.0 dated Nov. 28, 2018, 6 pages.

* cited by examiner

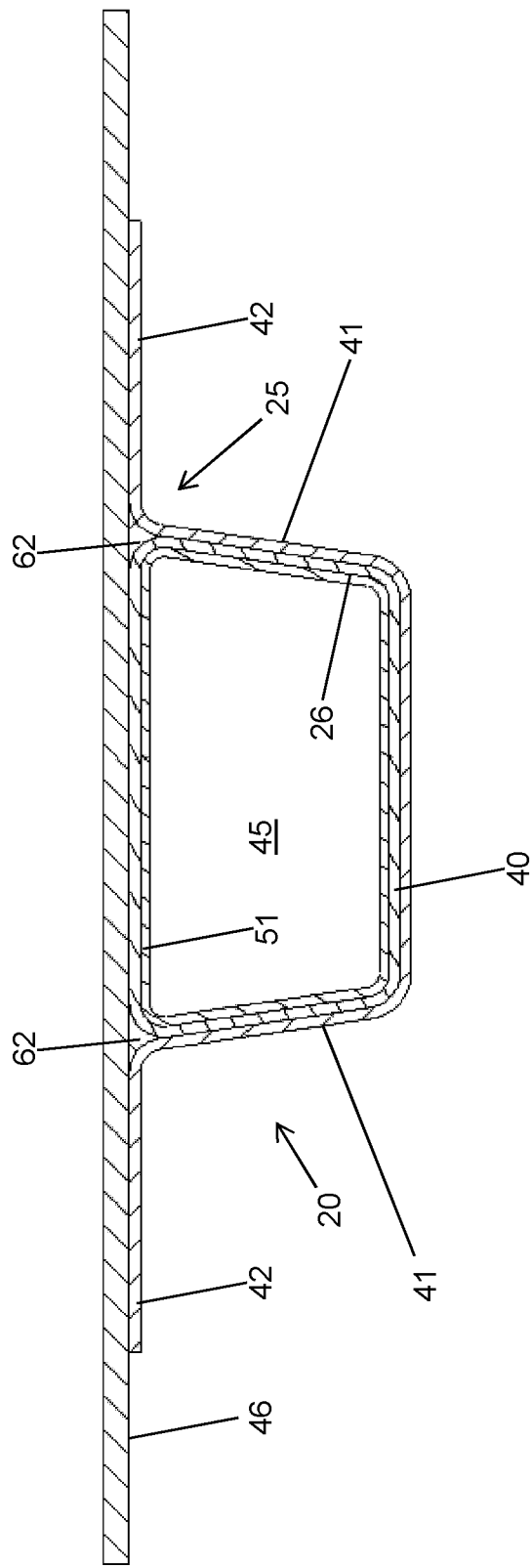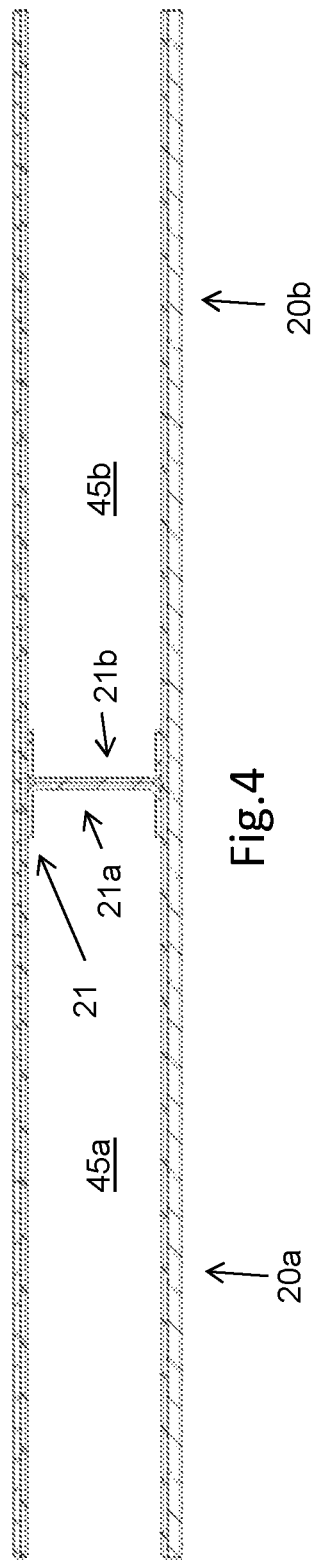

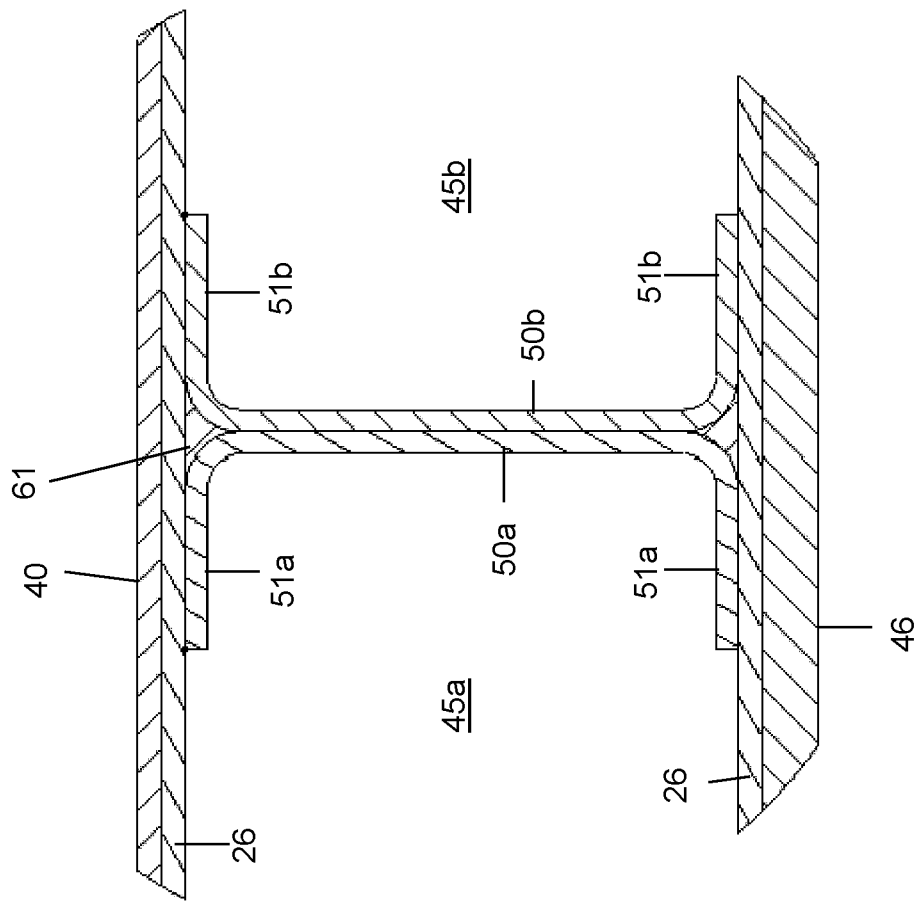

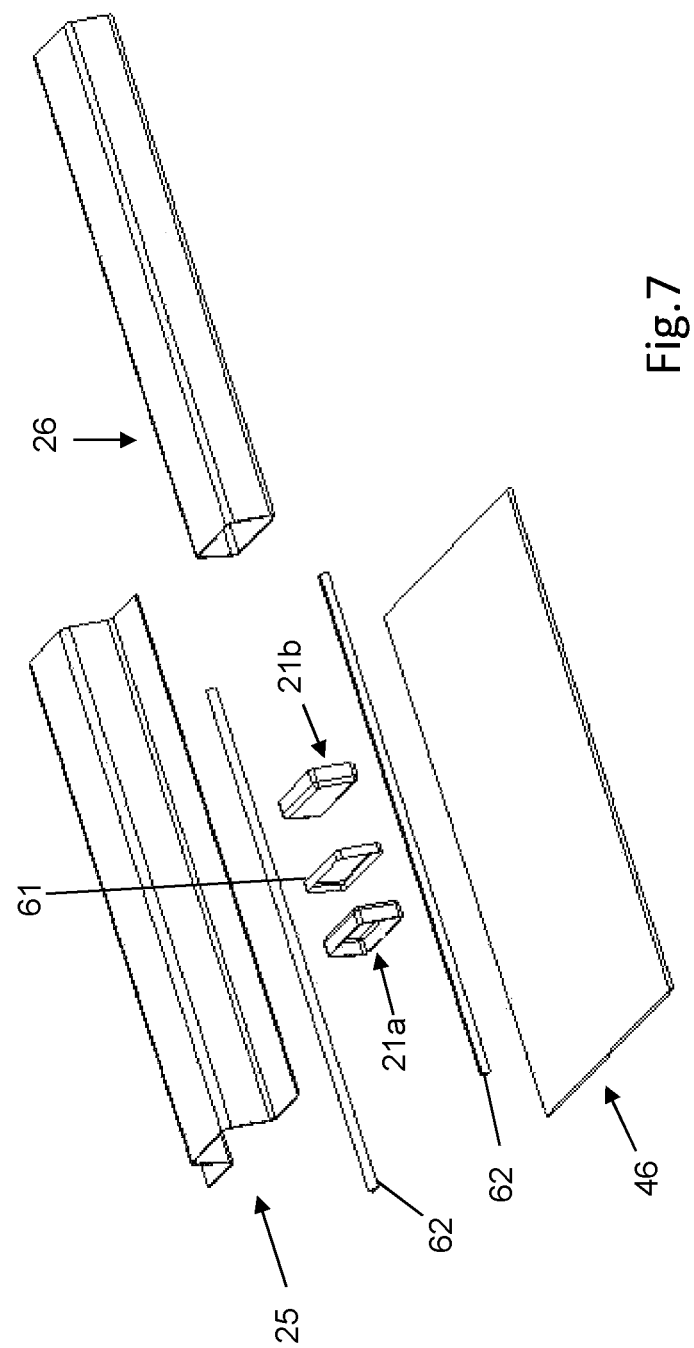

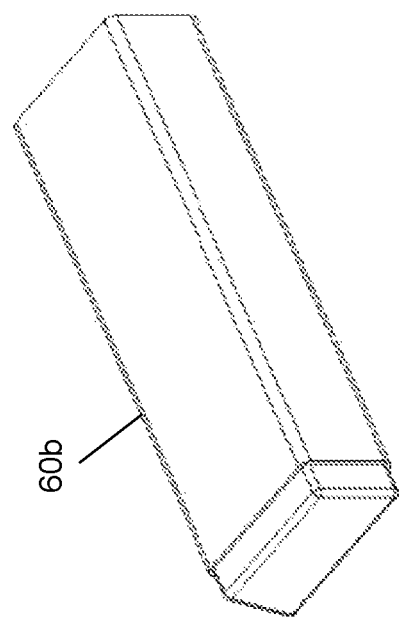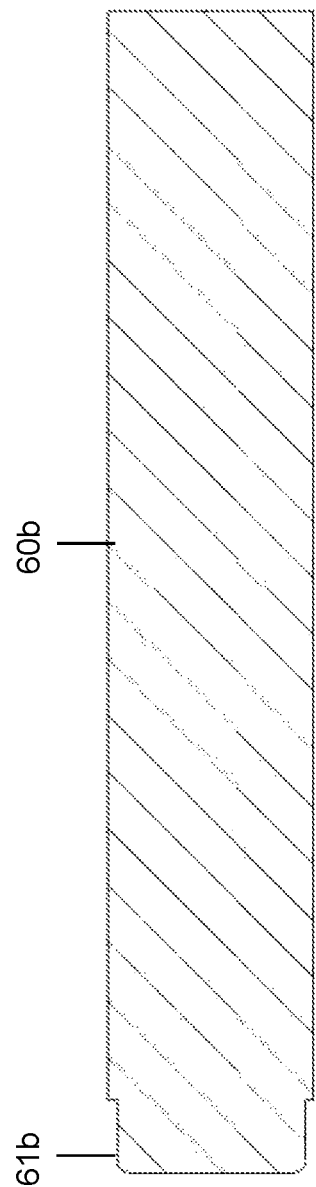

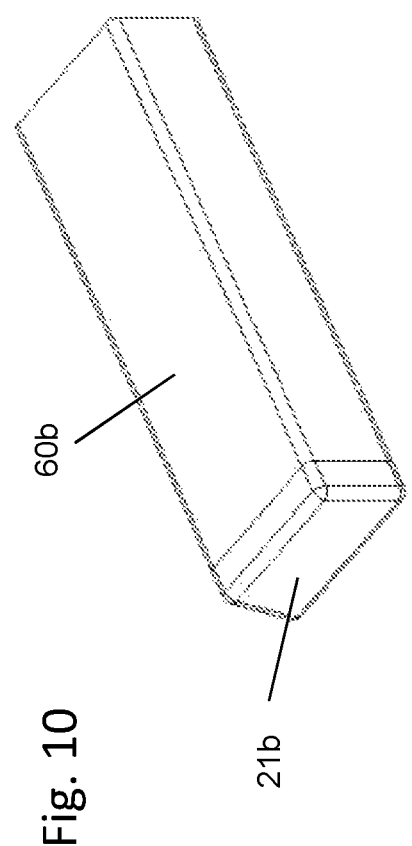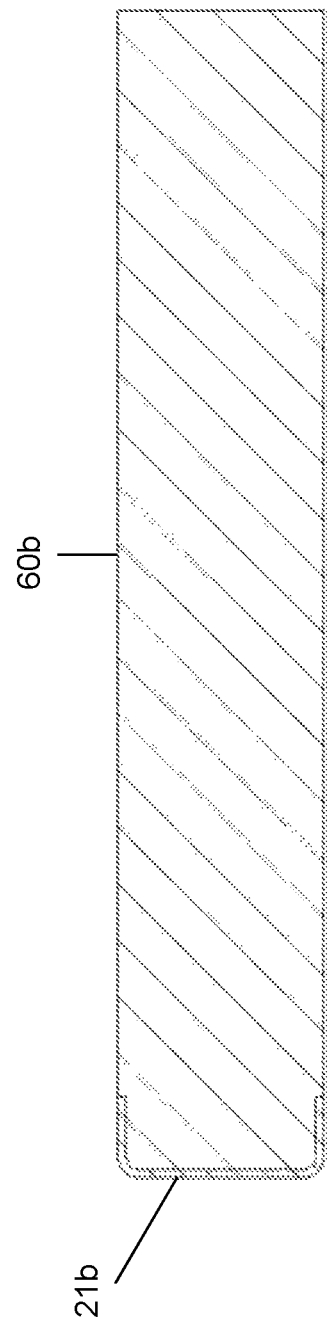

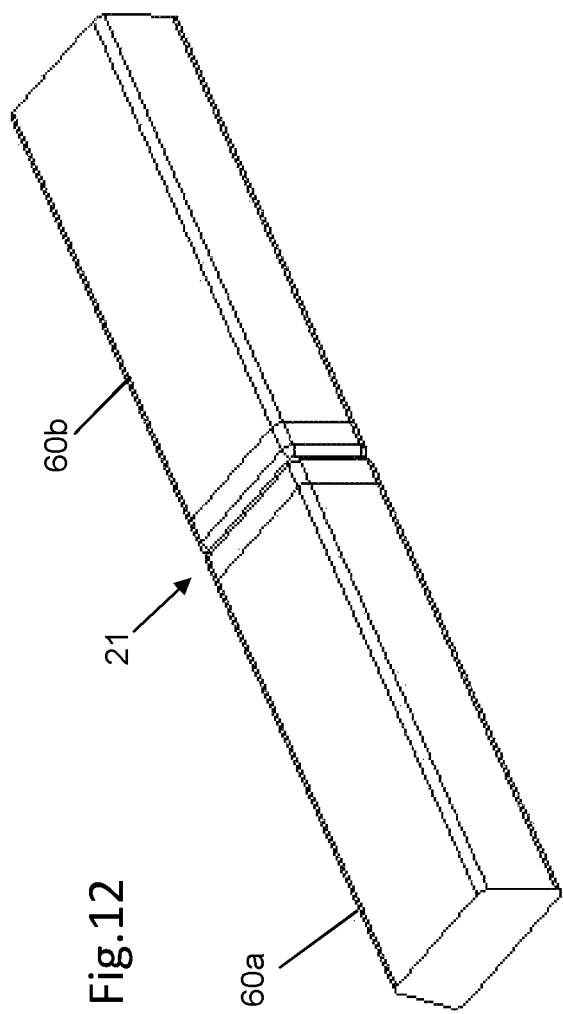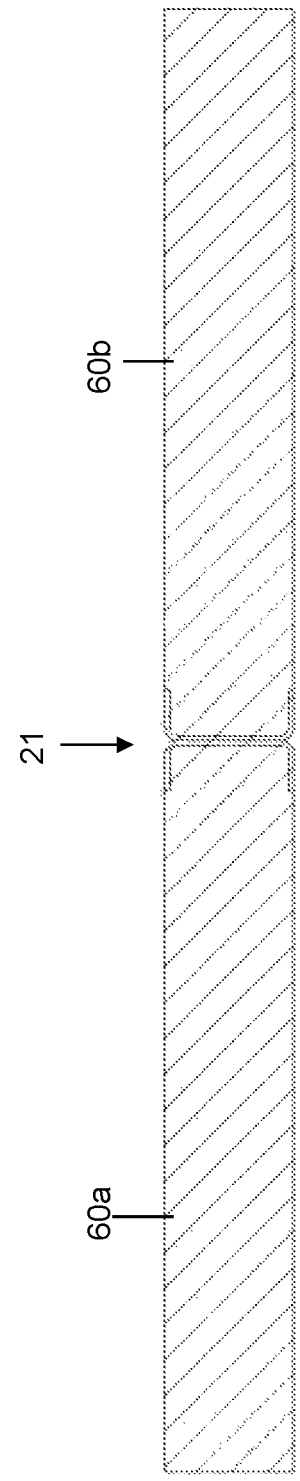

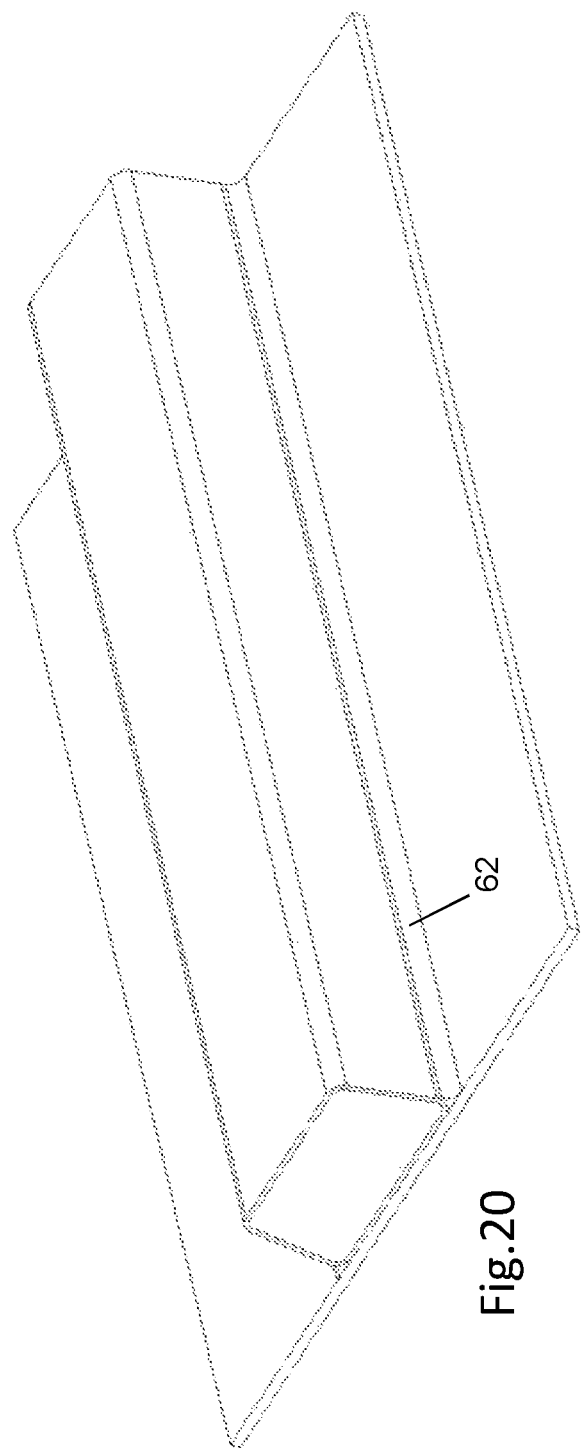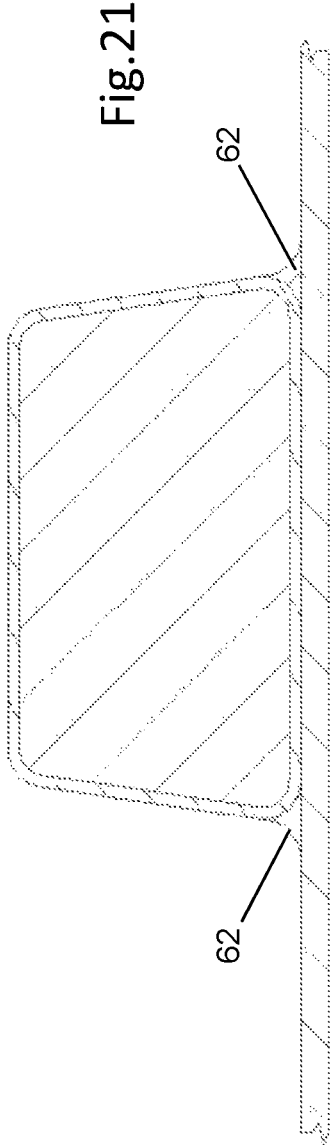

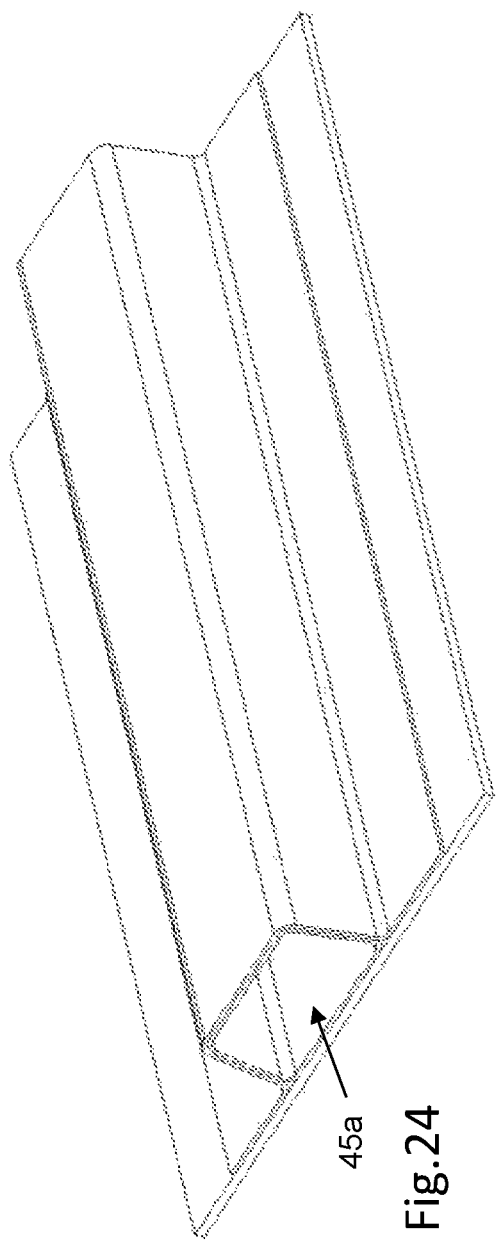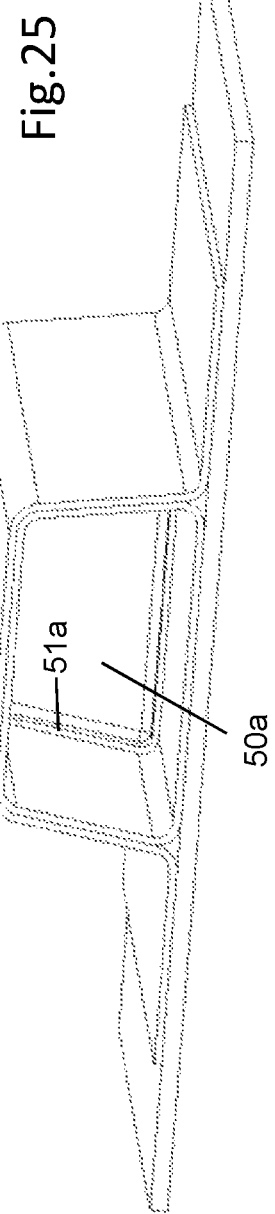

DUCT STRINGER WITH BULKHEAD

RELATED APPLICATION

This application claims priority to United Kingdom Patent Application GB 1810730.0 filed Jun. 29, 2018, which is incorporated by reference in its entirety.

FIELD OF THE INVENTION

The present invention relates to a duct stringer adapted to transport fluid, and a method of manufacturing a duct stringer.

BACKGROUND OF THE INVENTION

US 2013/0316147 discloses a stringer adapted to transport fluid in an aircraft wing. The stringer may be adapted to provide venting to one or more fuel tanks in the aircraft wing, or it may be adapted to provide fuel to the one or more fuel tanks. A downpipe is provided for providing a fluidic connection between the stringer and a fuel tank.

US 2015/0239570 discloses a vent dam for use in a vent stringer in a fuel vent system. The vent dam is configured to mount to and within the vent stringer. The vent dam has a contoured guiding surface for guiding fuel flow into and out of an interior of the vent stringer. The vent dam, the vent stringer, and a tube attached to the vent stringer are in fluid communication with one or more fuel tanks. The vent dam further has one or more side flanges extending from the contoured guiding surface for providing attachment of the vent dam to one or more interior portions of the vent stringer. The contoured guiding surface and the one or more side flanges are formed as one piece. The one or more side flanges may be mechanically attached to the vent stringer via one or more fastener elements. In another embodiment, the one or more side flanges may be bonded or adhered to the vent stringer via a bonding agent. In an embodiment, a two piece vent dam design is inserted through an access opening of the vent stringer.

SUMMARY OF THE INVENTION

According to a first aspect of the invention, there is provided a duct stringer comprising: duct walls providing a duct with a closed cross-section, wherein the duct is adapted to transport fluid; and a bulkhead in the duct, wherein the bulkhead is adapted to block the flow of fluid along the duct and the bulkhead is adhered to the duct walls by one or more co-cured or co-bonded joints.

In US 2015/0239570, the side flanges may be bonded or adhered to the vent stringer via a bonding agent, thereby forming a secondary-bonded joint. In such a secondary-bonded joint, the adhesive is a bonding agent made from a different material to the adherends. By contrast, in the present invention the bulkhead is adhered to the duct walls by one or more co-cured or co-bonded joints in which the bulkhead is adhered to the duct walls by an adhesive which is the same material as the bulkhead and/or the duct walls (the adherends).

Co-cured or co-bonded joints are advantageous compared with the secondary-bonded joints of US 2015/0239570 because they are simpler. They also enable the duct stringer to be assembled in an un-cured or partially cured state, making it easier to assemble.

A co-cured joint is a joint in which the adhesive and the adherends have been cured together in a single curing process. The co-cured joint(s) may be formed by providing the duct and the bulkhead as un-cured parts and then curing them in contact with each other. For instance the uncured parts may be made of pre-preg composite material comprising fibres impregnated with a matrix material such as epoxy resin. Alternatively the co-cured joint(s) may be formed by providing the duct and the bulkhead as dry-fibre parts, co-infusing them with matrix material, and then curing the matrix material to form the co-cured joint(s). In both cases the adhesive is the matrix material, which is the same as the matrix material of the bulkhead and/or the duct walls.

A co-bonded joint is a joint in which an uncured adherend has been placed in contact with a cured adherend, and then cured to form the joint. In this case the adhesive is the same material as the uncured adherend (which may be the bulkhead or the duct walls).

Optionally the duct stringer and the bulkhead are made of composite material, such as a fibre-reinforced composite material. The composite material of the duct stringer may be the same as the composite material of the bulkhead, or different.

Optionally the duct stringer comprises: a structural member with a hat-shaped cross-section, the structural member comprising a crown, a pair of webs and a pair of feet; and a duct member adhered to the crown and to opposed inner faces of the webs, wherein the duct walls are provided by the duct member.

Optionally the bulkhead comprises a pair of C-section bulkhead parts which are positioned back-to-back to form an I-section, each C-section bulkhead part comprises a web and one or more flanges, and each flange is adhered to the duct walls by a respective co-cured or co-bonded joint.

Optionally the bulkhead divides the duct into a first portion on a first side of the bulkhead and a second portion on a second side of the bulkhead. Optionally the first portion is adapted to transport fluid via an interconnecting pipe.

Optionally the first portion is adapted to transport fluid; and the second portion is not adapted to transport fluid.

Optionally the bulkhead is adhered to the duct walls around a full periphery of the bulkhead, so that the bulkhead substantially prevents the flow of fluid between the first and second portions of the duct.

Optionally the duct is in fluid communication with a tank, such as a fuel tank or surge tank, via an interconnecting pipe.

The fluid transported by the duct may be air, fuel, or any other fluid.

The duct stringer may be adhered to a skin to form a structure such as a stiffened panel structure. The skin may be a skin of a vehicle such as a boat or aircraft. For instance the skin may be a boat hull, an aircraft wing skin or an aircraft fuselage skin.

Optionally the skin is made of a composite material, such as a fibre-reinforced composite material.

Optionally the duct stringer is adhered to the skin by one or more co-cured or co-bonded joints.

A further aspect of the invention provides a fuel system comprising a first tank; a second tank; and a duct stringer according to the first aspect, wherein the duct is in fluid communication with the first and second tanks.

Optionally the first tank is a fuel tank, and the second tank is a surge tank.

Optionally one or both of the tanks are in an aircraft wing.

Optionally the duct is in fluid communication with the first or second tank via an interconnecting pipe.

Optionally the bulkhead divides the duct into a first portion on a first side of the bulkhead which is in fluid communication with the first and second tanks; and a second portion on a second side of the bulkhead, which may not be adapted to transport fluid.

A further aspect of the invention provides an aircraft comprising a duct stringer according to the first aspect.

A further aspect of the invention provides a method of manufacturing a duct stringer, the method comprising: forming duct walls around a bulkhead, wherein the duct walls provide a duct with a closed cross-section, and the duct is adapted to transport fluid; and after the duct walls have been formed around the bulkhead, curing the bulkhead or the duct walls, thereby co-curing or co-bonding the bulkhead to the duct walls so that the bulkhead is adapted to block the flow of fluid along the duct.

Optionally the bulkhead and the duct walls are cured together in a single curing process, thereby co-curing the bulkhead to the duct walls. The duct walls and the bulkhead may be provided as un-cured parts and then cured in contact with each other to co-cure the bulkhead to the duct walls. Alternatively the duct walls and the bulkhead may be provided as dry-fibre parts, co-infused with matrix material, and then cured together to co-cure the bulkhead to the duct walls.

Alternatively the duct walls or the bulkhead may be provided as un-cured part and then cured in contact with the other (cured) part to co-bond the bulkhead to the duct walls. The un-cured part may be uncured pre-preg material, or dry-fibre material which is infused then cured to form the co-bonded joint(s). In one embodiment the duct walls are provided as an un-cured part and then cured in contact with the bulkhead to co-bond the bulkhead to the duct walls. In this case the bulkhead may be formed from a thermoplastic material.

Optionally, forming the duct walls around the bulkhead comprises wrapping or laying-up a duct member around the bulkhead so that the duct member has a closed cross-section and surrounds the bulkhead.

Optionally the method comprises: providing a pair of mandrels; positioning the mandrels end-to-end with the bulkhead between them; wherein forming the duct walls around the bulkhead comprises wrapping or laying-up the duct walls around the bulkhead and the mandrels; and after the bulkhead has been adhered to the duct walls, removing the mandrels from opposite ends of the duct.

Optionally the bulkhead comprises a pair of C-section bulkhead parts, and the method comprises: providing each C-section bulkhead part on a respective mandrel, wherein each bulkhead part comprises a web and one or more flanges; positioning the mandrels end-to-end with the bulkhead parts back-to-back between them; wherein forming the duct walls around the bulkhead comprises wrapping or laying-up the duct walls around the bulkhead parts and the mandrels; wherein the flanges of the bulkhead parts are co-cured or co-bonded to the duct walls; and after the bulkhead has been adhered to the duct walls, removing the mandrels from opposite ends of the duct.

The duct stringer may be adhered to a skin. Optionally adhering the duct stringer to the skin comprises curing the duct stringer and the skin together in a single curing process, thereby co-curing the duct stringer to the skin.

BRIEF DESCRIPTION OF THE DRAWINGS

Embodiments of the invention will now be described with reference to the accompanying drawings, in which:

FIG. 3 is a tranverse cross-section across one of the duct stringers;
FIGS. 4-25 show a method of manufacturing one of the duct stringers.

DETAILED DESCRIPTION OF EMBODIMENT(S)

Figure 1:
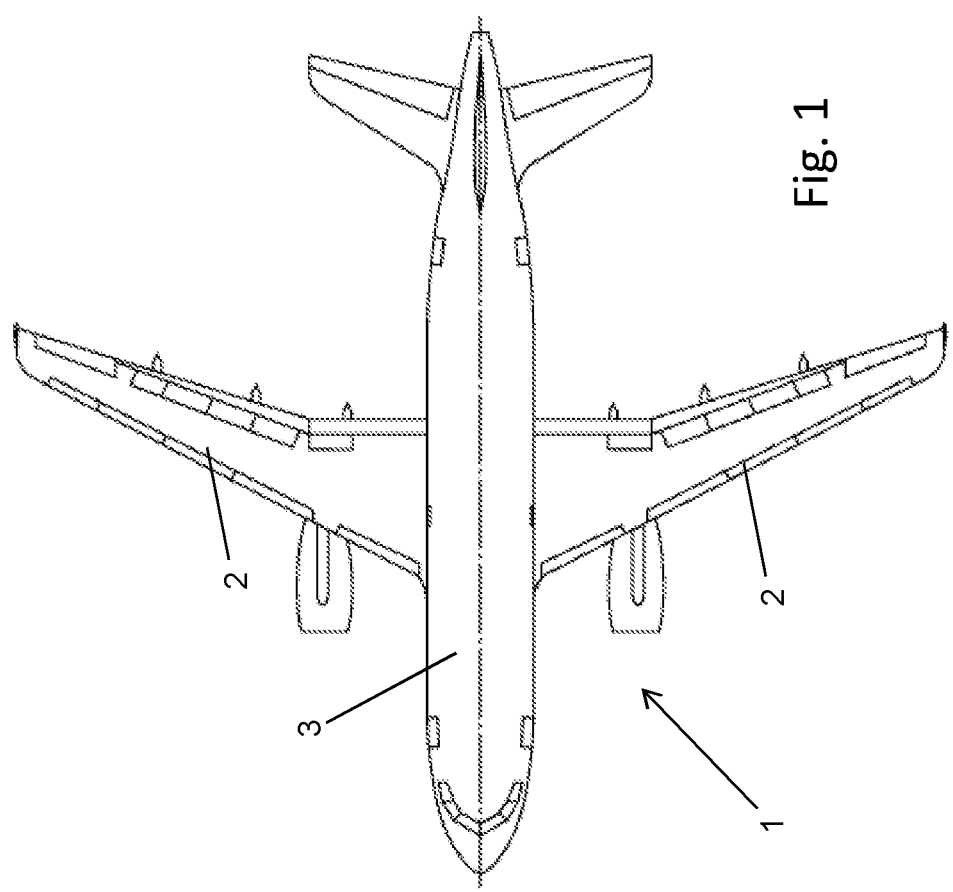
FIG. 1 is a plan view of an aircraft.
Figure 2:
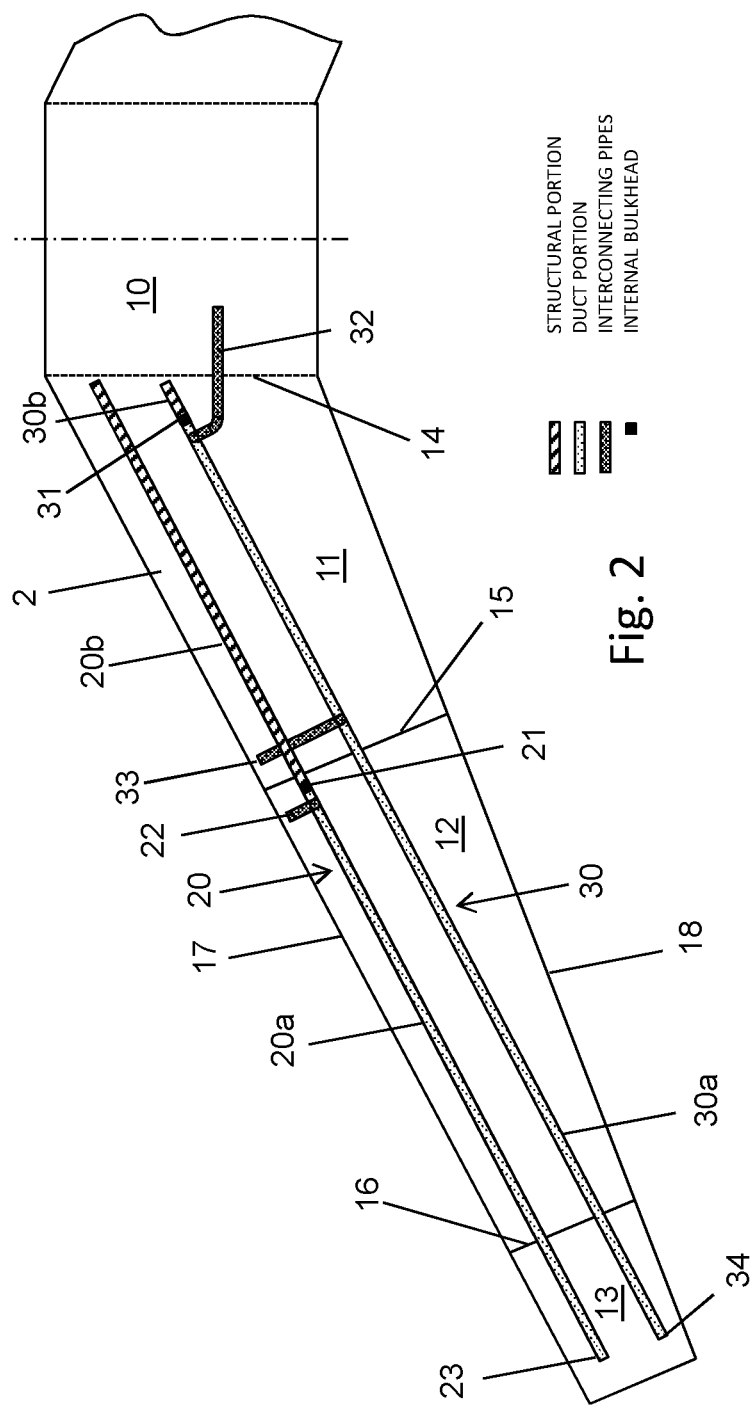
FIG. 2 is a plan view of the aircraft's fuel tank system.

FIG. 1 is a plan view of an aircraft 1 comprising a pair of wings 2 and a fuselage 3. FIG. 2 is a plan view of certain elements of the aircraft's fuel tank system, including a centre fuel tank 10 inside the fuselage, and wing tanks 11-13 inside the wing 2. The wing tanks comprise an inboard fuel tank 11, an outboard fuel tank 12 and a surge tank 13. The tanks 10-13 are separated by ribs 14-16.

The wing tanks 11-13 are bounded fore and aft by spars 17, 18. The upper and lower boundaries of the wing tanks 11-13 are provided by upper and lower wing skins, not shown in FIG. 1. Each wing skin is stiffened by stringers running span-wise along the length of the wing. Two of the stringers attached to the upper wing skin are so-called "duct stringers" 20, 30 which are shown in FIG. 2. The other stringers attached to the upper wing skin are not shown in order to simplify the drawing.

Each duct stringer 20, 30 includes a duct portion 20a, 30a outboard of an internal bulkhead 21, 31; and a structural portion 20b, 30b inboard of the internal bulkhead 21, 31.

The duct portion 20a of the duct stringer 20 is in fluid communication with the outboard fuel tank 12 via an interconnecting pipe 22 and with the surge tank 13 via an outlet 23 at the end of the stringer 20. The duct portion 30a of the duct stringer 30 is in fluid communication with the inboard fuel tank 11 via an interconnecting pipe 33 and with the surge tank 13 via an outlet 34 at the end of the stringer 30. The duct portion 30a of the duct stringer 30 is also in fluid communication with the centre fuel tank 10 via an interconnecting pipe 32. Optionally, the distal end of each interconnecting pipe 22, 32, 33 is fitted with a bell mouth or float valve, not shown.

During operation of the aircraft, the duct stringers 20, 30 are used to transport air in either direction between the surge tank 13 and the fuel tanks 10-13 in order to manage the air pressure within the tanks. So each duct stringer 20, 30 has two functions: stiffening the upper wing skin; and providing a duct which transports air to and from the surge tank 13.

FIG. 3 is a transverse cross-sectional view of the duct stringer 20 and the upper wing skin 46 which carries it. The other duct stringer 30 has an identical construction so will not be described in detail. The duct stringer 20 comprises a structural member 25 with a hat-shaped cross-section, a duct member 26 with a closed trapezoidal cross-section; and a pair of noodles 62. The structural member 25 has a crown 40, a pair of webs 41 and a pair of feet 42. The crown 40, webs 41 and feet 42 are formed as a single laminar composite part, with plies of the composite material running from one foot 42 to the other via the webs 41 and the crown 40. The duct member 26 is adhered to the crown 40 and to the opposed inner faces of the webs 41 by respective co-cured joints. The duct member 26 and the feet 42 of the structural member are adhered to the upper wing skin 46 by co-cured joints. The duct member 26 provides duct walls which fully enclose a duct 45a,b with a closed trapezoidal cross-section which is adapted to transport air between the tanks 12, 13.

The bulkhead 21 divides the duct into a first portion 45a on a first side of the bulkhead and a second portion 45b on a second side of the bulkhead as shown in FIG. 4. The first portion 45a of the duct (which runs along the duct portion 20a shown in FIG. 2) is adapted to transport air; and the second portion 45b of the duct (which runs along the structural portion 20b shown in FIG. 2) is not adapted to transport air so may optionally be blocked at its inboard end.

The interconnecting pipe 22 is connected to the first portion 45a of the duct 45a by cutting a hole in the crown 40, and attaching a downpipe fitting (not shown) such as the fitting described in US2013/0316147, the disclosure of which is incorporated herein by reference.

Figure 6:
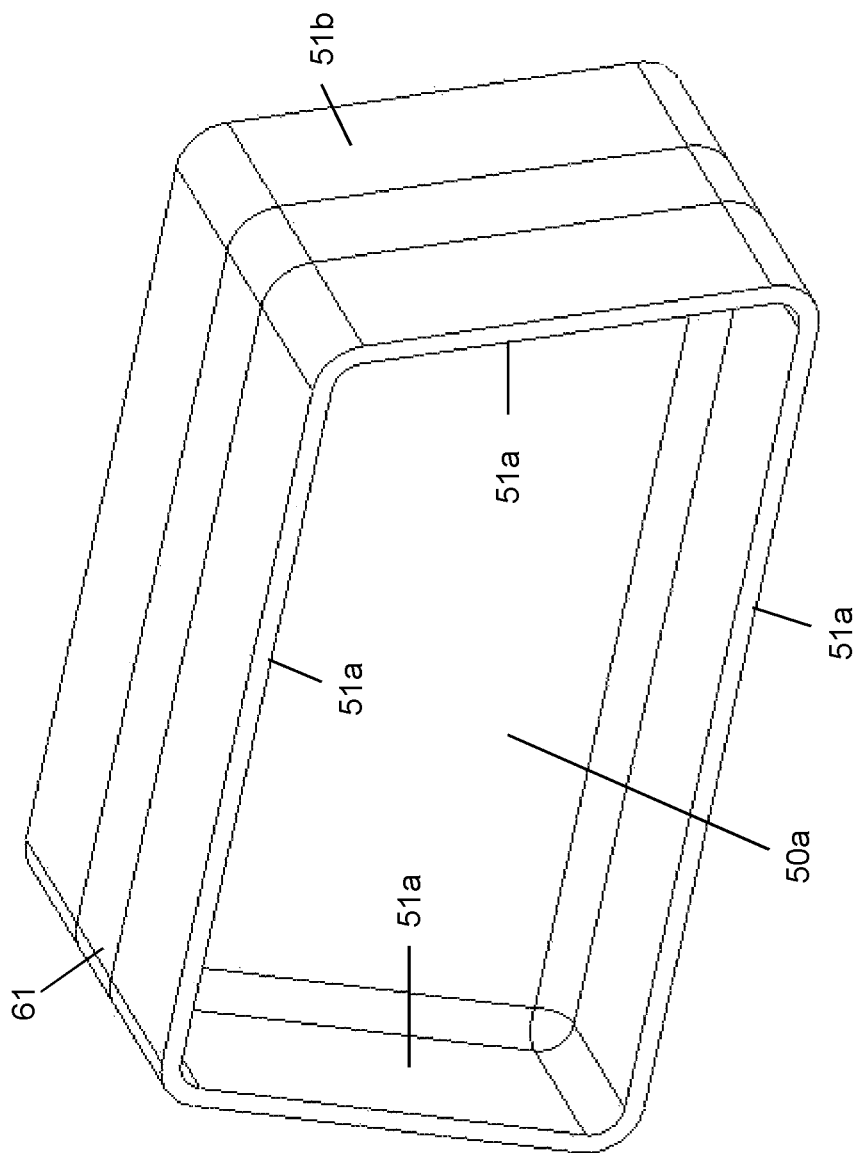

FIGS. 4-6 show the structure of the bulkhead 21. The bulkhead 21 comprises a pair of C-section bulkhead parts 21a, 21b which are positioned back-to-back to form an I-section; and a noodle 61, e.g., a fillet. Each C-section bulkhead part comprises a web 50a, b and a flange 51a,b. Each flange 51a,b is adhered to the duct member 26 by a respective co-cured or co-bonded joint.

As shown in FIGS. 3 and 6, each flange 51a,b has a closed trapezoidal cross-section and runs around the bulkhead. Each flange 51a,b is adhered to the duct member 26 around its full periphery so that the bulkhead substantially prevents the flow of fluid between the two portions of the duct.

FIGS. 8-23 show a method of manufacturing the structure of FIGS. 3 and 4.

A pair of mandrels 60a,b are provided. Both mandrels 60a,b are shown in FIG. 12. The mandrels are identical so only one will be described in detail with reference to FIGS. 8 to 11.

The mandrel 60b may be formed of silicone rubber, and has a recess 61b at one end. The bulkhead part 21b is fitted in the recess 61b as shown in FIGS. 10 and 11. This may be achieved by laying-up the bulkhead part 21b ply-by-ply directly into the recess 61b, or by laying it up ply-by-ply on a male tool (now shown) then transferring it onto the mandrel 60b.

The bulkhead part 21b at this stage is a dry-fibre preform, comprising dry carbon fibre plies and a binder. The plies are formed with darts to enable them to be laid up without wrinkling to form the corners of the flange 51b.

Figure 14:
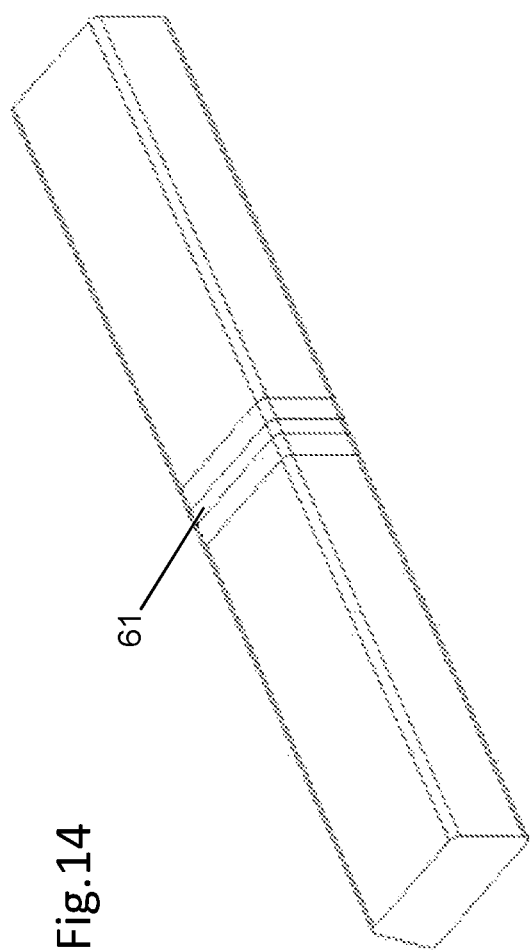
Figure 15:
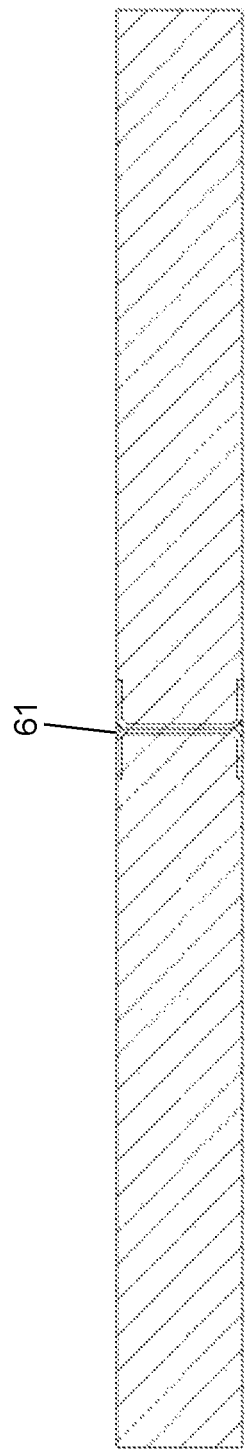

The mandrels are then positioned end-to-end with the bulkhead between them as in FIGS. 12 and 13. Next, a noodle 61 is fitted as shown in FIGS. 14 and 15

Figure 16:
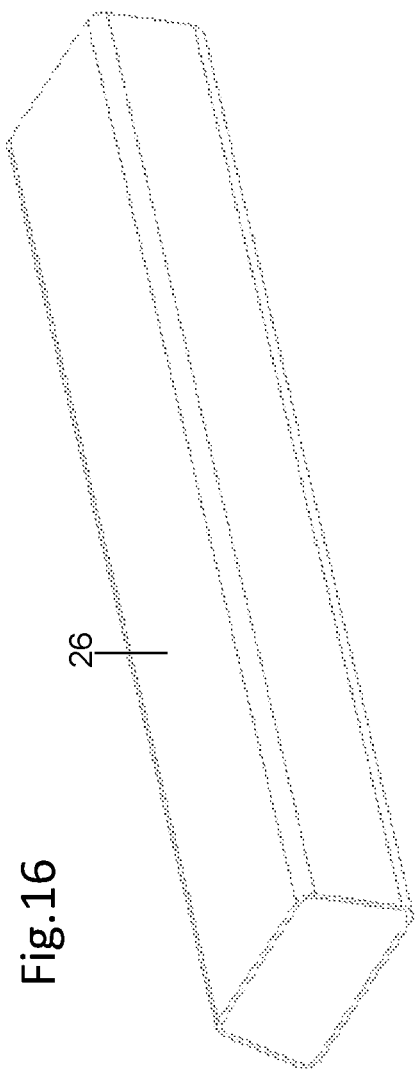
Figure 17:
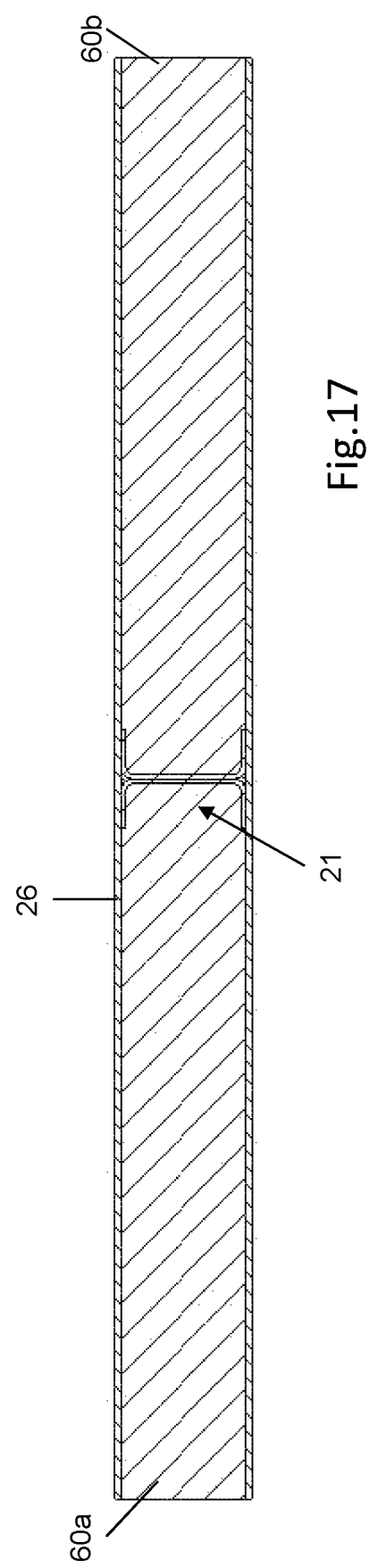

The duct member 26 is then formed by wrapping or laying-up around the bulkhead 21 and the mandrels 60a,b as shown in FIGS. 16 and 17. This may be achieved by laying-up the duct member 26 ply-by-ply directly onto the bulkhead 21 and the mandrels; 60a,b; or by laying it up as a flat or C-section charge and then wrapping the charge around the bulkhead 21 and the mandrels; 60a,b. The duct member 26 at this stage is a dry-fibre preform, comprising dry carbon fibre plies and a binder.

Note that the duct member 26 is formed around the bulkhead 21 as a dry-fibre preform, rather than inserting the bulkhead 21 into a previously formed duct. This makes the structure easy to assemble.

Figure 18:
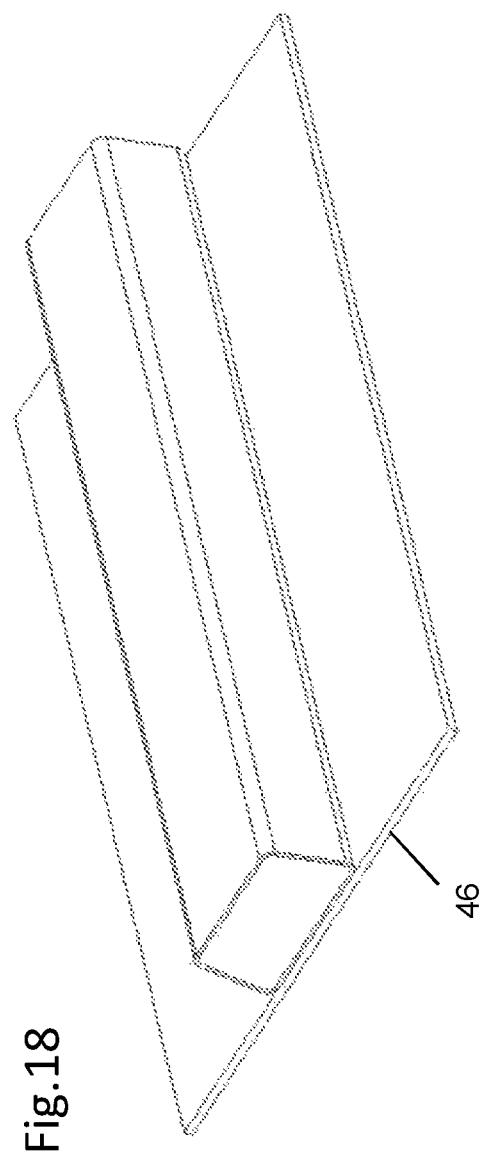
Figure 19:
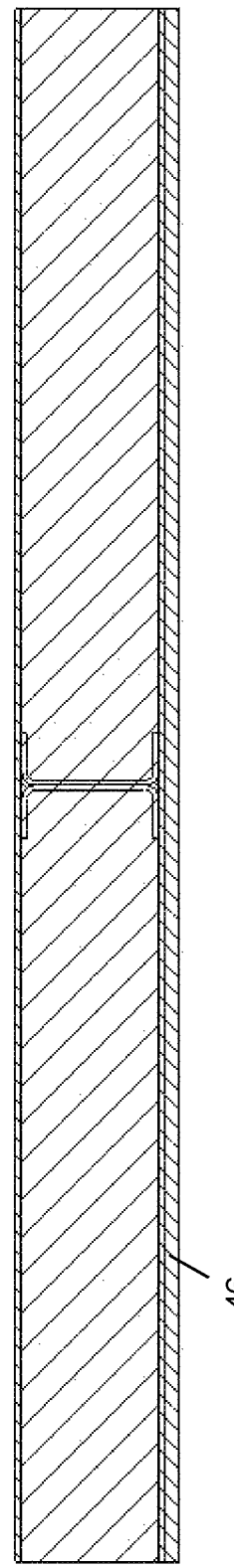

Next the assembly is placed onto the skin 46 as shown in FIGS. 18 and 19, and noodles 62 are fitted as shown in FIGS. 20 and 21. The skin 46 at this stage is a dry-fibre preform, comprising dry carbon fibre plies and a binder.

Figure 22:
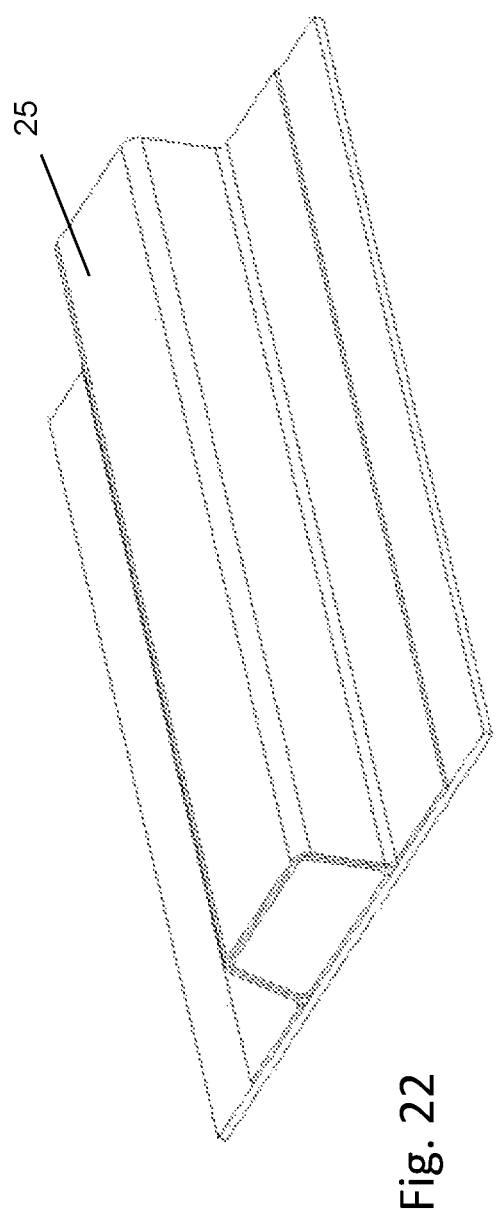
Figure 23:
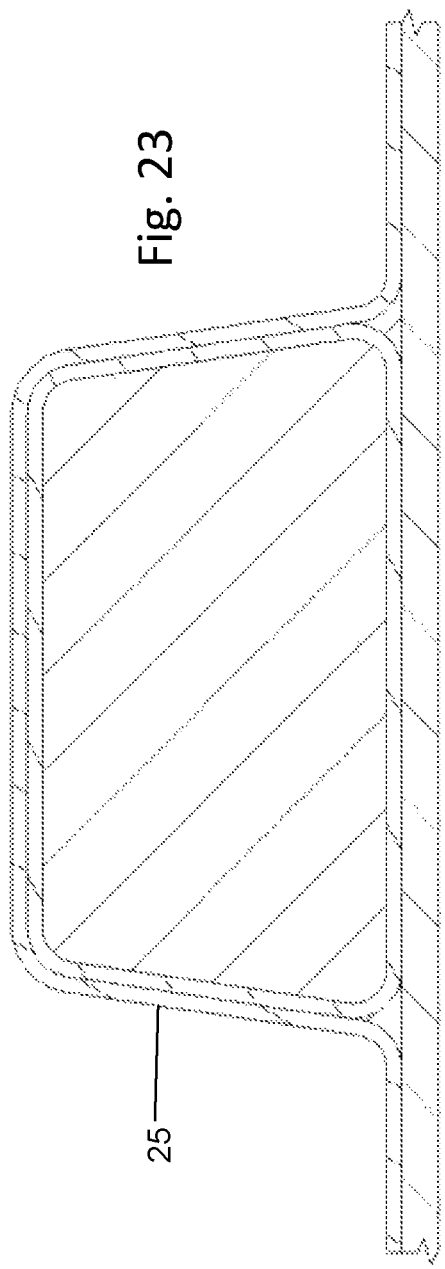

Next the hat-section structural member 25 is laid-up over the assembly as in FIGS. 22 and 23. The structural member 25 at this stage is a dry-fibre preform, comprising dry carbon fibre plies and a binder.

Next the assembly is covered with a vacuum bag (not shown) and the composite parts 21, 25, 26, 46, 61, 62 co-infused with epoxy resin matrix material. After infusion, the matrix material cures to form the various co-cured joints in a single curing process. After the parts are fully cured, the mandrels are removed from opposite ends of the duct as shown in FIGS. 24 and 25.

In the method described above, the structure is formed by infusion of resin into dry fibre preforms, but alternatively some or all of the carbon-fibre parts 21, 25, 26, 46, 61, 62 may be laid up as "pre-preg" laminates, where each ply in the laminate is a fibre ply pre-impregnated with thermosetting epoxy resin which is cured by heating after the structure has been assembled.

In the method described above, the bulkhead is a two-part bulkhead which is adhered to the duct walls by co-cured joints, but in an alternative embodiment the bulkhead may be a pre-manufactured thermoplastic single piece bulkhead which is co-bonded to the duct walls.

Figure 26A:
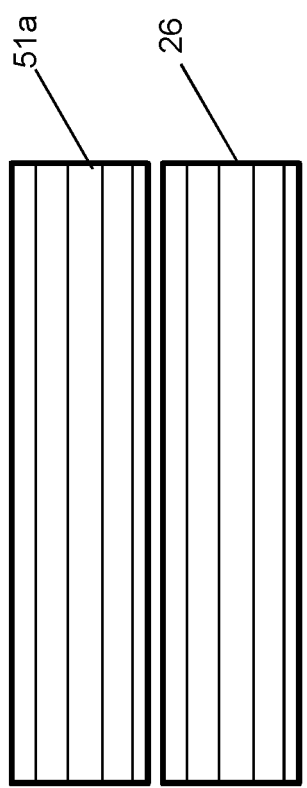
FIGS. 26a and 26b schematically show the formation of a co-bonded joint in the structure of FIG. 3.
Figure 26B:
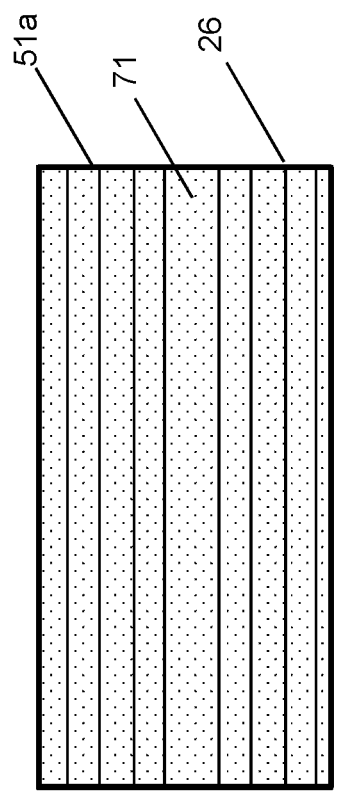

FIGS. 26a and 26b schematically show the formation of a co-cured joint between two elements of the structure described above. In this example, the adherends are the flange 51a and the duct member 26, but the other co-cured joints are similar.

The adherends are first placed together as dry-fibre preforms as in FIG. 26a, with no epoxy resin. After being co-infused with epoxy resin matrix material, the epoxy resin is cured to form the co-cured joint 70 of FIG. 26b. The adhesive at the bond line 71 is the same material as the epoxy resin matrix material in the adherends 51a, 26.

Where the word or appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims

The invention claimed is:

1. A duct stringer comprising:
   duct walls providing a duct with a closed cross-section, wherein the duct is adapted to transport a fluid; and
   a bulkhead in the duct, wherein the bulkhead is adapted to block a flow of the fluid along the duct and the bulkhead is adhered to the duct walls by one or more co-cured and/or co-bonded joints,
   wherein the bulkhead comprises a pair of bulkhead parts which are positioned back-to-back, each of the bulkhead parts comprises a web and a flange, and each of the flanges is adhered to the duct walls by a respective one of the co-cured and/or co-bonded joints extending around an entire periphery of the bulkhead, and
   wherein each of the flanges has a closed cross-section extending entirely around the bulkhead.

2. The duct stringer according to claim 1, comprising:
   a structural member with a hat-shaped cross-section, the structural member comprising a crown, a pair of webs and a pair of feet; and
   a duct member adhered to the crown and to opposed inner faces of the pair of webs, wherein the duct walls are provided by the duct member.

3. The duct stringer according to claim 1, wherein the bulkhead divides the duct into a first portion on a first side of the bulkhead and a second portion on a second side of the bulkhead; and the first portion is adapted to transport fluid via an interconnecting pipe.

4. The duct stringer according to claim 3, wherein the bulkhead is adhered to the duct walls around a full periphery of the bulkhead so that the bulkhead substantially prevents the flow of fluid between the first and second portions of the duct.

5. The duct stringer according to claim 1, wherein the duct is in fluid communication with a tank via an interconnecting pipe.

6. A structure comprising a skin; and the duct stringer according to claim 1 adhered to the skin.

7. A fuel system comprising:
a first tank;
a second tank; and
a duct stringer including duct walls defining a duct having a closed cross-section, wherein the duct is adapted to transport a fluid; and
a bulkhead in the duct, wherein the bulkhead is configured to block a flow of the fluid in the duct and the bulkhead is adhered to the duct walls by one or more co-cured and/or co-bonded joints,
wherein the duct is in fluid communication with the first and second tanks,
wherein the bulkhead comprises bulkhead parts positioned back-to-back to each other, each of the bulkhead parts comprises a web and a flange, and each of the flanges is adhered to the duct walls by a co-cured joint and/or co-bonded joint, and
wherein the flange for each of the respective bulkhead parts extends entirely around an inner perimeter of the duct and forms a closed cross-section extending entirely around a perimeter of the web.

8. The fuel system according to claim 7, wherein the first tank is a fuel tank, and the second tank is a surge tank.

9. The fuel system according to claim 7, wherein one or both of the first and second tanks are in an aircraft wing.

10. The fuel system according to claim 7, wherein the duct is in fluid communication with the first and/or second tank via an interconnecting pipe.

11. The fuel system according to claim 7, wherein the bulkhead divides the duct into a first portion on a first side of the bulkhead which is in fluid communication with the first and second tanks; and a second portion on a second side of the bulkhead.

12. An aircraft comprising the duct stringer according to claim 1.

13. A wing comprising:
a skin having an outer surface exposed to an airstream flowing over the wing and an inner surface, opposite to the outer surface;
a duct stringer attached to the inner surface and including duct walls defining a duct with a closed cross-section;
a bulkhead in the duct, and
a co-cured and/or co-bonded joint between the bulkhead the duct walls,
wherein the duct is configured to transport a gas along a portion of the duct on one side of the bulkhead,
wherein the bulkhead in the duct is configured to block a flow of the gas through the duct,
wherein the bulkhead comprises bulkhead parts positioned back-to-back to each other, each of the bulkhead parts comprises a web and a flange, and each of the flanges is adhered to the duct walls by a co-cured joint and/or co-bonded joint, and
wherein the flange for each of the respective bulkhead parts extends entirely around an inner perimeter of the duct and forms a closed cross-section extending entirely around a perimeter of the web.

14. The wing of claim 13, wherein the skin is an upper skin and the wing further includes:
a lower skin opposite the upper skin; and
a first fuel tank and a second fuel tank both between the upper and lower skins, wherein the second fuel tank is separated from the first fuel tank in a spanwise direction of the wing;
wherein the duct is in fluid communication with the first fuel tank and the second fuel tank.

* * * * *